Patented Mar. 4, 1924.

1,485,378

UNITED STATES PATENT OFFICE.

WILLIAM H. ENGELS, OF RAHWAY, NEW JERSEY, ASSIGNOR TO MERCK & CO., OF NEW YORK, N. Y., A CORPORATION OF NEW YORK.

ANTISPASMODIC COMPOUND AND PROCESS OF PRODUCING THE SAME.

No Drawing. Original application filed April 25, 1922, Serial No. 556,424. Divided and this application filed May 13, 1922. Serial No. 560,719.

*To all whom it may concern:*

Be it known that I, WILLIAM H. ENGELS, a citizen of the Republic of Germany, and a resident of Rahway, in the county of Union and State of New Jersey, have invented certain new and useful Improvements in Antispasmodic Compounds and Processes of Producing the Same, of which the following is a specification.

Although benzyl sulfuric acid, benzyl phosphoric acid, benzyl succinic acid and benzyl phthalic acid have been mentioned in chemical literature as laboratory products (Beilstein II., p. 1050; II. Erg., pp. 638 and 1048; Berichte, 35, p. 4078), none of them has, so far as I know, received any industrial application, and particularly none in the therapeutic art.

So far as I know, in the only benzylesters which have heretofore received any industrial or therapeutic application (e. g., benzylbenzoate, benzylcinnamate, dibenzyl succinate, benzylsalicylate, and others), the acid group has been fully saturated by the benzyl group or groups, and a heretofore insurmountable obstacle to their use hypodermically has been their insolubility in water, in consequence of which their therapuetic use has been substantially limited to administration per os.

I have produced, for the first time, benzylester compounds and, specifically, alkali benzyl phthalates, especially sodium benzyl phthalate, of a water-solubility and purity compatible with hypodermic, intravenous and subcutaneous use, and a process by which they may be obtained, and I believe that I have not merely converted certain unused substances into products of great utility but have greatly enlarged the medicinally important field of antispasmodic remedies.

My invention also involves the discovery of the conditions under which any by-products that may be present with the unsaturated benzyl phthalate are eliminated at the same time that the ester is transformed into a water-soluble condition, so that I obtain a therapeutically pure water-soluble benzyl phthalate.

My present application is a division of my application Serial No. 556,424, which was filed in the United States Patent Office on or about April 25, 1922.

To explain one method by which my invention may be carried out, the following example is given:

1 kilogram of phthalic acid monobenzylester is dissolved in 7 litres 70% alcohol and neutralized with the required amount of sodium hydroxide or carbonate, applying heat to the mixture at the same time. The white sodium salt separates out as a bulky mass upon cooling.

In the illustrative example, the formation of the salt may be said to be under approximately anhydrous conditions, because the water present in the 70% alcohol is only sufficient to enable the by-products to be retained in the solvent, such by-products in this instance being more or less insoluble in alcohol alone. In the illustrative example of my process, I have mentioned sodium hydroxide or carbonate as the neutralizing compounds. It will be understood, however, that other alkali compounds, such, for example, as ammonium, potassium or lithium hydroxide or carbonates are to be considered as equivalents.

What I claim and desire to secure by Letters Patent of the United States is:

1. As an antispasmodic adapted for hypodermic injection, a therapeutically pure alkali benzyl phthalate.

2. As an antispasmodic adapted for hypodermic injection, therapeutically pure sodium benzyl phthalate.

3. The process of making an alkali benzyl phthalate which consists in treating phthalic acid monobenzylester with an alkali base under approximately anhydrous conditions and isolating the salt.

4. The process of simultaneously purifying and rendering water-soluble phthalic acid partially saturated by a benzyl group, which consists in completing the saturation by combination with an alkali under approximately anhydrous conditions.

WILLIAM H. ENGELS.

Witnesses:
R. E. GRUBER,
F. W. HENDERSHOTT.